Dec. 16, 1924.

J. W. CALLAHAN

HAY DISTRIBUTOR

Filed Aug. 29, 1922

1,519,954

Inventor
John W. Callahan

By *[signature]*

Attorney

Patented Dec. 16, 1924.

1,519,954

UNITED STATES PATENT OFFICE.

JOHN W. CALLAHAN, OF WELLSBORO, PENNSYLVANIA, ASSIGNOR, BY MESNE ASSIGNMENTS, TO CALLAHAN DISTRIBUTOR COMPANY, INCORPORATED.

HAY DISTRIBUTOR.

Application filed August 29, 1922. Serial No. 585,065.

*To all whom it may concern:*

Be it known that I, JOHN W. CALLAHAN, a citizen of the United States, residing at Wellsboro, in the county of Tioga, State of Pennsylvania, have invented certain new and useful Improvements in Hay Distributors; and I do hereby declare the following to be a full, clear, and exact description of the invention, such as will enable others skilled in the art to which it appertains to make and use the same.

This invention relates to hay handling and particularly to distributing hay in a barn.

The principal object of the invention is to provide a novel and improved method and apparatus whereby the hay may be properly and evenly distributed to all parts of the barn without the usual laborious necessity of distributing the same by means of hand forks.

Other objects and advantages will be apparent from the following description when taken in connection with the accompanying drawing.

Figure 1:
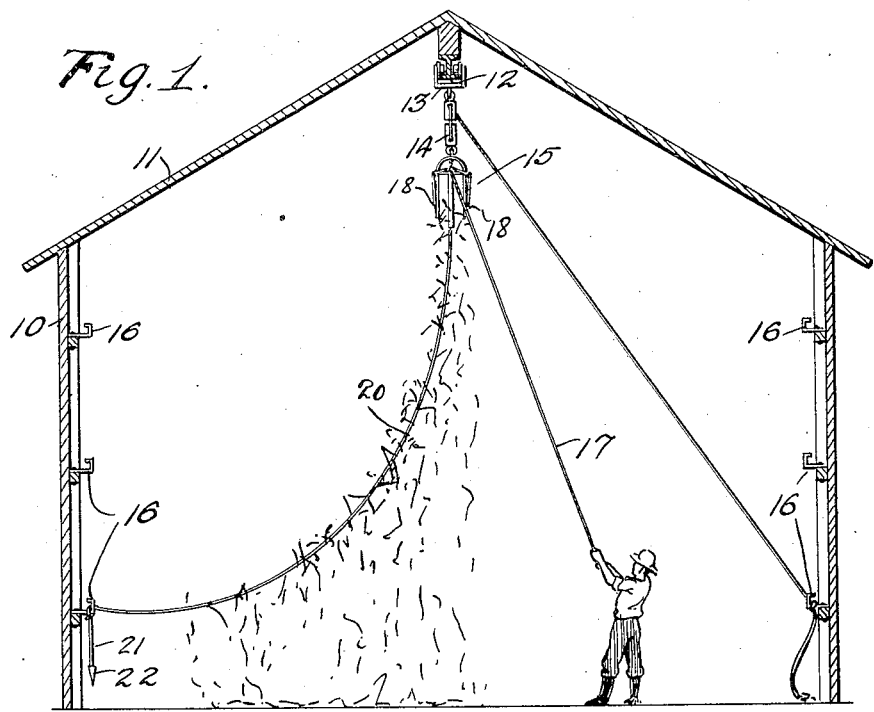
Figure 1 is a cross sectional view of a barn showing an embodiment of the invention in operation.
Figure 2:
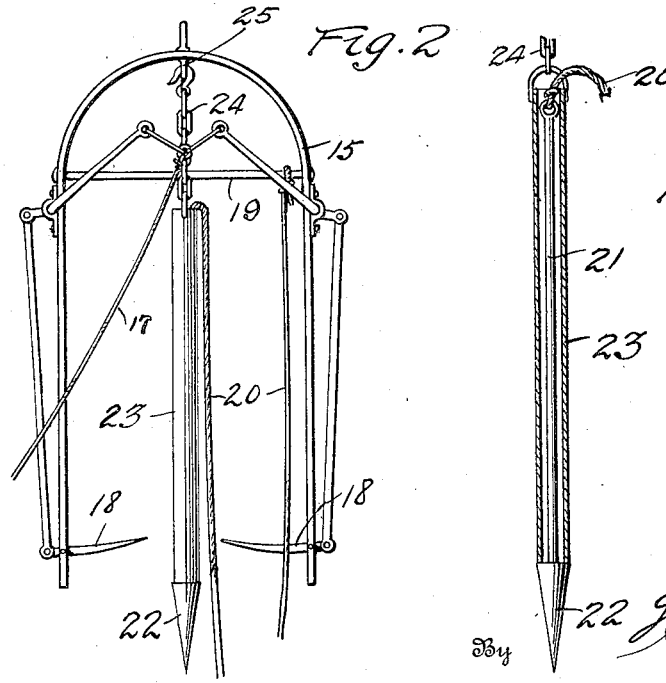
Figure 2 is an enlarged elevation of the hay elevating fork.
Figure 3:
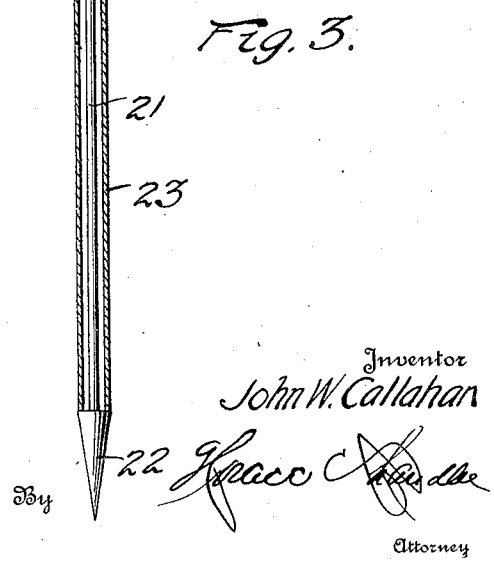
Figure 3 is an enlarged elevation, partly in section, of the hay needle and rope receiving guiding tube.

Referring particularly to the accompanying drawing, 10 represents the walls of the barn, and 11 the ridge of the roof, the latter supporting the longitudinally extending track 12, on which runs the carrier 13. On the carrier is the block and tackle 14 which is used to raise and lower the elevating fork 15. On the walls of the barn, at different elevations, and in series lengthwise of the walls, are the hook members 16, to which reference will be made later herein. The fork 15 is provided with the usual trip rope for releasing the hay holding fingers, the trip rope being designated by the numeral 17, and the fingers by the numeral 18. Connected to the cross bar 19, of the fork 15, is one end of a long rope 20, and connected to the other end of this rope is the butt end of the needle 21, the other end of the needle having an arrow head 22, which is adapted to be plunged through the fork-full of hay, as will be explained later, in the description of the operation. The rope 20 is disposed through a tube 23, of suitable length, and connected to the upper end of the tube is a chain 24, said chain having a hook for engagement with an eye 25, on the upper arched end of the fork 15.

In the operation of the invention, the fork is lowered to the wagon of hay, the operator plunging the fork into the hay and causing the fingers 18 to be extended to hold the hay. The operator also plunges the tube 23, with the needle 21 therein, through the fork-full of hay, and connects the chain 24 to the eye 25. The fork 15 is then drawn up to the top of the barn by block and tackle 14, the needle 21 being anchored in place and the rope 20 sliding through the tube 23 which is in the fork-full of hay. He then fastens the needle end of the rope 20 to one of the wall carried hooks 16, at or near the position at which the fork-full of hay is to be deposited. The fork-full of hay is then released by pulling trip rope 17 to operate the holding fingers 18, when the hay will drop from the tines of the fork, and slide down on the rope 20, said rope being disposed through the center of the hay, and within the tube which is suspended from fork 15. By securing the lower end of the rope 20 to the different hooks 16, the different fork-fulls of hay may be delivered to the parts of the barn at which they are wanted, thus doing away with the usual laborious method of spreading or distributing the hay with hand forks.

What is claimed is:

1. In hay distributing apparatus, the combination of an elevating hay fork operable to release its load, hay piercing means comprising a shank having a pointed head thereon and a sheath in which said shank is received, a flexible member connected to said shank and having its other end supported with said fork, and means for detachably connecting said sheath to said fork.

2. In hay distributing apparatus, the combination of an elevating hay fork operable to release its load, a hay piercing member comprising a shank having an enlarged pointed head integral therewith, and a flexible guiding member connected at one end to said shank and its other end supported with said fork.

3. In hay distributing apparatus, the combination of a hay fork operable to release its load, hay piercing means comprising a pointed head and a rigid tubular member, a flexible member connected to said pointed head, means for raising said fork, and flexible means detachably connecting said sheath to said fork.

4. In hay distributing apparatus, the combination of an elevating hay fork operable to release its load, hay piercing means, a flexible connection between said hay piercing means and said fork, a sheath for said hay piercing means adapted to guide said flexible means, and a chain detachably connecting said sheath to said fork.

5. In hay distributing apparatus, hay piercing means comprising a shank having a pointed head, a flexible member connected to said shank and a tubular member adapted to act as a guide for said flexible member.

In testimony whereof, I affix my signature, in the presence of two witnesses.

JOHN W. CALLAHAN.

Witnesses:
  EVAN P. REES,
  WILLIAM E. CHAMPAIGN.